United States Patent
Bretschneider et al.

(10) Patent No.: US 6,964,801 B1
(45) Date of Patent: Nov. 15, 2005

(54) METHOD FOR PRODUCING A HEAT SHIELD AND HEAT SHIELD PRODUCED BY THIS METHOD

(75) Inventors: Bernd Bretschneider, Ichenhausen (DE); Kai-Uwe Lemke, Ulm (DE); Dieter Grafl, Ulm (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/341,225

(22) PCT Filed: Jan. 7, 1998

(86) PCT No.: PCT/DE98/00065

§ 371 (c)(1),
(2), (4) Date: Sep. 29, 1999

(87) PCT Pub. No.: WO98/30416

PCT Pub. Date: Jul. 16, 1998

(30) Foreign Application Priority Data

Jan. 10, 1997 (DE) ................................ 197 00 628

(51) Int. Cl.$^7$ ............................ B32B 1/04; B27N 3/18; E04C 2/54
(52) U.S. Cl. ............................ 428/70; 428/71; 428/75; 428/76; 428/172; 428/212; 428/913; 264/241; 264/319; 156/219; 156/273.1; 52/787.12; 52/794.1
(58) Field of Search ............................ 428/68, 70, 71, 428/75, 76, 172, 913, 212, 409; 264/241, 264/252, 319, 285, 405; 52/783.1, 787.11, 52/787.12, 794.1; 156/219, 273.1

(56) References Cited

U.S. PATENT DOCUMENTS

| | | | | | |
|---|---|---|---|---|---|
| 2,576,698 | A | * | 11/1951 | Russum | 428/75 |
| 3,003,902 | A | * | 1/1961 | McDuff | 428/75 |
| 2,989,156 | A | * | 6/1961 | Brooks et al. | 52/788.1 |
| 3,031,358 | A | * | 4/1962 | Rutter et al. | 428/75 |
| 3,041,219 | A | * | 6/1962 | Steck | 428/138 |
| 3,302,358 | A | * | 2/1967 | Jackson | 428/76 |
| 4,594,279 | A | * | 6/1986 | Yoneno et al. | 428/69 |
| 4,669,632 | A | * | 6/1987 | Kawasaki et al. | 428/172 |
| 5,032,439 | A | * | 7/1991 | Glicksman et al. | 428/44 |
| 5,316,816 | A | * | 5/1994 | Sextl et al. | 428/75 |
| 6,221,456 | B1 | * | 4/2001 | Pogorski et al. | 428/69 |
| 6,279,229 | B1 | * | 8/2001 | Bretschneider et al. | 29/890.3 |

FOREIGN PATENT DOCUMENTS

DE  38 34054 C2  4/1990
DE  39 05871 C2  8/1990

* cited by examiner

Primary Examiner—Donald J. Loney
(74) Attorney, Agent, or Firm—Rader, Fishman & Grauer PLLC

(57) ABSTRACT

A heat shield suitable for motor vehicles and a method for manufacturing the heat shield is provided. The heat shield is intended to protect temperature-sensitive assemblies, components and connection lines from the direct impact of heat radiation and, possibly, acts as insulation. Moreover, the heat shield may also provide advantageous soundproofing properties. The heat shield is comprised of first and second plates that are at least partially deformable and an insulating material positioned between said plates. Preferably, at least a portion of said insulating material is in the form of compacted powder or flakes.

31 Claims, 3 Drawing Sheets

METHOD FOR PRODUCING A HEAT SHIELD AND HEAT SHIELD PRODUCED BY THIS METHOD

FIELD OF THE INVENTION

The present invention relates to a heat shield that is suitable for use in connection with a motor vehicle and a method for manufacturing the same. The heat shield is intended to protect temperature-sensitive assemblies, components and connection lines from the direct impact of heat radiation. Moreover, the heat shield acts as insulation. Furthermore, the present invention is intended to provide sound-proofing qualities.

BACKGROUND OF THE INVENTION

The need for the use of heat shields has greatly increased in motor vehicles. This is essentially caused by the fact that the space available in the engine compartments of motor vehicles has to be exploited to the maximum in order to accommodate the assemblies, components and connection lines necessary for operation, such that these parts have to be arranged very close to one another. This leads to heat-sensitive components having to be arranged very close to very hot components, such as for example the exhaust system, the combustion engine or the heat exchanger. The heat radiated by these elements can adversely affect the functioning of the heat-sensitive components. To this end, the heat-sensitive elements or components are protected from the heat radiation and the high temperatures by heat shields arranged in front of them.

DE 38 34 054 C2 discloses a heat shield, in which, in order to protect from heat radiation, at least two flat materials are used which are connected to one another on at least two edge regions turned away from one another. The flat materials mentioned are connected to one another in such a way that a gap is formed between them. Moreover, with this known heat shield it is important that the flat material facing the source of the heat radiation is so oriented in its expansion characteristic by pre-determined profiling or beading or corresponding choice of material that it expands towards the heat source. Through corresponding configuration, adaptation to the heat load arising should be made possible, since with higher temperatures the spacing of the two flat materials used, which should preferably consist of sheet metal is increased and an enlarged air gap is produced which naturally improves the insulation effect.

The heat shield described in DE 38 34 054 C2 can then be further improved in relation to its insulating effect if a heat insulation layer is applied in addition to the inner surfaces of the flat materials proposed there. Suitable insulating materials may include organic or inorganic fibre materials, but also metallic woven fabrics, knitted fabrics or expanded metals (grids), which are also intended to improve the soundproofing.

The heat shield described therein has a substantial disadvantage in the fact that it is not possible for every conceivable contour of the heat shield to be configured to achieve the desired effect for adaptation to the different temperatures.

Moreover, the insulation effect is limited if only an air gap is used without additional heat-insulating materials.

If on the other hand, as explained already, heat-insulating layers are applied, then in return increased manufacturing outlay is incurred. For the application of the heat-insulating materials as a heat-insulating layer, binding agents are necessary.

However, such binding agents generally have organic components which cause problems at the high temperatures.

Furthermore, in DE 39 05 871 C2, a compound material for heat insulation and sound proofing for screening parts and heat shields in the automobile field are described. An insulation layer, consisting of a thermally resistant highly porous inorganic material is used which is enclosed on at least one side with a stabilising, structurally fixed covering layer, preferably a metal foil. This covering layer surrounds the insulation layer in one example completely, or, in the case where the compound material, formed from an insulation layer and the covering layer, is disposed on the surface of a screening part, on the side turned away from the surface of the screening part.

For the insulation layer, various inorganic materials are mentioned which are preferably foamable (water glass, foamed glass, glass concrete, foamed ceramic or clay mineral materials) and thermally resistant reinforcing fibres or flakes (mica or graphite). The insulation layer of the compound material described there should be manufactured by foaming of a suitable material. The foamed material is then surrounded with the covering layer already mentioned. Here, besides the relatively high manufacturing outlay, what has proved disadvantageous is that the foamed material has, after it has hardened, a specific shape which can only be altered slightly or with additional outlay. This leads to problems and to increased technological outlay in the manufacture of heat shields, when more complicated shapes are necessary for same.

DE 39 05 871 C2 discloses a concept of adding thermally resistant fibres or flakes (mica or graphite) to the actual insulation layer material. Such fibres or flakes are intended to improve in particular the mechanical properties.

A further disadvantage of heat shields manufactured according to this theory consists in the fact, that greater forces acting on these heat shields can lead to deformations, or even to rupturing of the insulation layer material. This can lead to impairment of the actual functioning, and in conjunction with vibrations, to noise.

Moreover, it must be guaranteed that the composite material described in DE 39 05 871 C2 is surrounded by outer covering layers and a connection with the screening part must be ensured, which prevents vibrations occurring which can lead to annoyance caused by noise.

Proceeding from the above, an object of the present invention is to propose a method and a heat shield manufactured with this method, the method being intended to be simple and able to be carried out at a favourable cost, and the heat shield manufactured with this method being safe from a toxicological and ecological point of view.

SUMMARY OF THE INVENTION

For the manufacture of a heat shield according to the present invention, insulating material in powder or flake form is used. This insulating material is applied loose to a plate which consists of at least one material which is partially plastically deformable. Here it is possible for only one portion of the surface to be covered by the insulating material. In particular, the edge regions or the regions for apertures (screw holes) of the plate should be kept free.

Vermiculite, a decomposition product of mica, has proved to be particularly suitable as an insulating material. But mica itself can also be used, or expanded graphite or perlite. It is also possible to add fillers to the insulating material, such as sand for example.

Following the trickling-on process, a second plate with a pressing tool, or a pressing tool on its own, is moved towards the sprinkled surface of the first plate, and the insulating material, trickled loose onto the first plate, is if necessary distributed, and after a sufficient compressive force has been applied to the insulating material by means of the two plates or the pressing tool, in one or more pressing cycles, and compaction of the insulating materials has been achieved at least in regions, the two plates are connected to one another in their edge regions. The procedure can also be such that the compressing of the insulating material takes place after the feeding of the two plates in the direction of the first plate shortly before the connection in the edge region takes place, i.e. the compaction is a separate step. It is not absolutely necessary for the edge to be completely closed.

For connecting the two plates to one another, suitable positive and/or non-positive connections can be considered. However it has been shown that flanging of the edges on at least two opposite sides of the plates to be connected to one another is sufficient. Reliable enclosure of the insulating material between the two plates is however given if the edges are flanged on all sides.

The method according to the invention can, however, also be carried out in such a way that, after the loose application of insulating material on the first plate, for example with a pressing tool, the insulating material is compacted and thereafter pre-determinable regions can be deliberately provided with additional insulating material in a loose form, which regions are then in turn compacted under pressure applied with a second pressing tool, which can be correspondingly contoured, or with the second plate. By this means, regions of the heat shield can be deliberately so manufactured that they have on the one hand higher compaction and on the other hand increased thickness, so that the desired properties can be deliberately influenced, also taking into consideration the sound proofing.

The process can be carried out very simply, and thus it is possible for the insulating material to be distributed with a suitable conveying or feeding device more or less evenly on the first plate. Storage containers in the form of hoppers with an aperture can, for example, serve as feeding devices. From this hopper the insulating material can be applied to a conveyor belt, from which it is then led onto the first plate. Application from the hopper via two counter-rotating rollers is also possible. Doctor blades can also be arranged at suitable points. A second variant consists in the fact that the insulating material used is so trickled on that a cone of material forms, which then, proceeding from the top of the cone, is pressed together with the second plate or a pressing tool, and thus the insulating material is distributed.

The place where the cone of material is formed can then be so selected that optimum distribution of the insulating material between the two plate-shaped structures is produced. Normally this will be the area centre of mass of the plate, on which the insulating material is trickled. The arrangement of the cone of material on the plate can however also be adjusted to conditions which may be necessary, such as the final shape of the heat shield to be manufactured or taking into account a special region which has to have an increased insulating effect.

In the distribution of the insulating material in powder or flake form, it is advantageous that here no binding agent has to be added and the individual grains or flakes can be distributed almost unhindered. Avoiding a binding agent has furthermore the advantage that no ecological and toxicological aspects have to be taken into account in the manufacture and use of the heat shields manufactured according to the invention, and there are also no problems in disposal.

Before the insulating material is trickled on, the first plate can be deformed at least partially trough-shaped, in order to prevent the insulating material trickled onto it from being lost. The deformation is preferably undertaken at the edges and can then be used subsequently in the actual connection of the two plates, between which the insulating material is to be received.

Losses of insulating material after trickling-on, can, moreover, be prevented, or at least reduced, if before the trickling-on of the insulating material, the surface on the first plate, which forms the base for the cone of material, is provided with an inorganic binding agent, preferably water glass, which is physiologically and ecologically safe.

Moreover, the distribution of the insulating material between the two plates can be deliberately influenced by recesses protrutions being worked in, into which a greater volume of insulating material can be received and consequently the insulating capacity of the heat shield can there be locally increased, which can be advantageous for certain uses. A further possible way of influencing the distribution of the insulating material in specific regions of the heat shield can, however, also be achieved in that beads and/or webs are present on at least one of the two plates or on a pressing tool, which on the one hand can receive more insulating material or, on the other hand, the webs are so configured that insulating material, after being trickled on, can be displaced deliberately from specific regions, or specific regions, (e.g. regions with screw holes) can be more strongly compacted.

According to the invention, however, it is also possible for the process to be carried out in such a way, that after the loose application of the insulating material, the compaction is carried out with a pressing tool, provided with recesses or apertures, or respectively a stepped pressing tool, such that non-compacted regions are formed, from which the loose insulating material can subsequently be removed.

These regions should preferably be formed where for example screw holes are provided for fastening the heat shield. The removal of the non-compacted insulating material can here come about in simple manner through blowing away or through suction.

A further possible way of configuring regions which are to be kept free of insulating material consists in, before the loose application of the insulating material, certain regions on the first plate, which can also be pre-determined, being electrostatically charged, and, after the application of the insulating material, the latter being removed from the non-charged regions. Following the removal of the undesired insulating material, the retained insulating material can then be compacted, as already described, and thereafter covered with the second plate.

In contrast thereto, however, there also exists the possibility of applying insulating material loose to the first plate and then removing it again with a tool which is electrostatically charged in regions. For this purpose, a plate-shaped element, but also a drum-shaped element, can be charged electrostatically on the surfaces, correspondingly in regions.

Thereafter the remaining insulating material, can be compacted as already described.

It is advantageous so to form especially edge regions, regions with narrow radii, that at least the amount of insulating material in these regions is reduced.

Since the heat shield, after the connection of the two plates, is not a rigid body, and the plates generally consist advantageously of a metal, additional three-dimensional deformation can easily be undertaken, and in this way the finally desired contour, which is optimally adapted to the necessary fitting circumstances in the engine compartment of a motor vehicle, are achieved. In this deformation, no problems occur through the enclosed insulating material, since no or at least only low binding forces between the individual grains or flakes have to be broken up, and the latter slide past one another only slightly hindered during the deformation, and the new shape can be achieved.

Morever, a binding agent provides a further advantage in that the soundproofing properties of the heat shield can be improved, since the soundwave energy can be very well decomposed with the aid of the mica in powder or flake form, and also there is no resultant long-term impairment. Naturally, there are also no resonance problems which could lead to increased noise impairment.

However it can also be advantageous if at least one of the two plates has increased surface roughness on the surface which comes into direct contact with the insulating material, since this has a positive effect on the distribution of the insulating material during the movement of the second plate onto the first plate and increased adhesion of the insulating material after being trickled on counteracts any undesired falling of insulating material.

In order to improve the effect of the heat shield, it is moreover advantageous if at least one of the plates is used with a coating applied on at least one side and reflecting the heat radiation. This coating should preferably be orientated towards the heat source.

To carry away heat, it is advantageous if the plate which is disposed on the side turned away from the heat source is thicker, and provided with ribs and/or consists of a material with good heat-conducting capacity, such that the received heat can be led away well.

BRIEF DESCRIPTION OF THE DRAWINGS

The invention is described below in greater detail with reference to the following drawing figures.

DETAILED DESCRIPTION OF PREFERRED EMBODIMENTS

Figure 1:
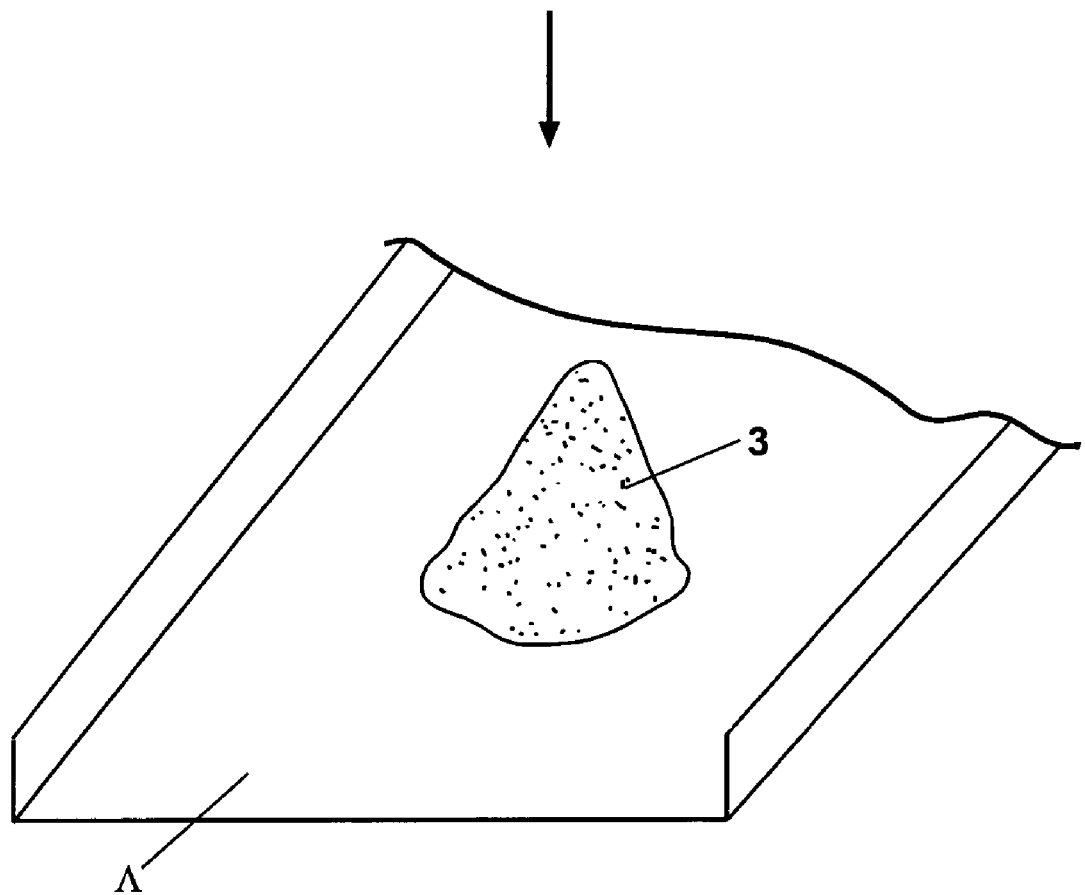
FIG. 1 is a top perspective view of an embodiment of the present invention illustrating a first plate and an insulating material positioned on said plate.

FIG. 1 illustrates an embodiment of the present invention in which a first plate 1 has been sprinkled with insulating material (mica in powder and/or flake form) on a portion of a surface which is configured practically flat. The sprinkling with the insulating material 3, in this example, took place by forming a cone of the material. The sprinkling can however take place over a somewhat larger surface. The edge regions or other regions of the plate 1 should preferably be deliberately not sprinkled or subsequently freed of insulating material 3.

In the embodiment shown in this figure, the edges of the plate 1 are bent upwards, in order to prevent sideways falling of insulating material 3. There is, however, also the possibility, which is not shown in this figure, of bending over the front edges of the plate 1 and producing a complete trough shape.

The arrow shown in FIG. 1 indicates the direction in which a second plate 2, not shown, is pressed towards the first plate 1. The pouring of the insulating material 3 is distributed relatively evenly with the movement of the non-represented plate 2, and in preferred form, the pressing force and the amount (especially the volume) of the trickled-on insulating material should be matched to one another in such a way that after the two plates have been connected, the insulating material 3 completely fills the space between the first plate 1 and the second plate 2.

Figure 2:
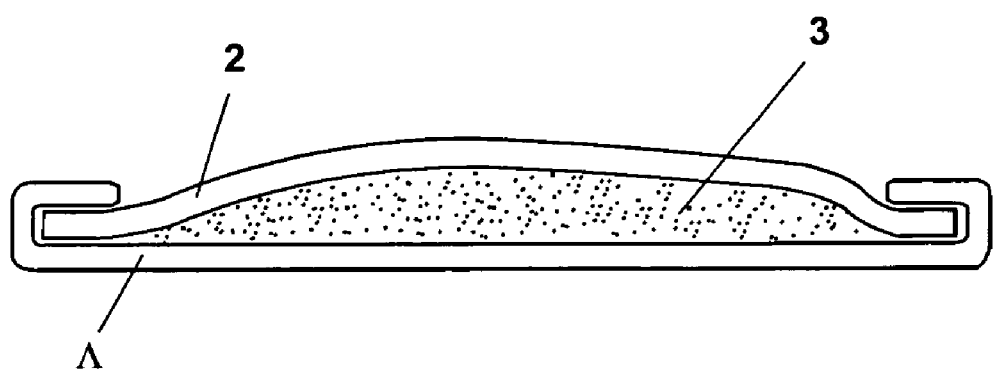
FIG. 2 a sectional view of an embodiment of a heat shield manufactured in accordance with one aspect of the present invention.

The section, shown in FIG. 2, through an example of a heat shield configured according to the invention, then shows how the edges of the first plate 1 can bend over the front edges of the second plate 2, and thus the connection of the two plates 1 and 2 can be produced. The flanged region is then suitable for the mounting of the finished heat shield and the engagement of suitable fastening elements.

On the example shown in FIG. 2, the deformation of the first plate 1 occurs exclusively to connect it with the second plate 2, and the second plate 2 is deformed during pressing against the first plate 1 as a result of the limited incompressibility of the insulating material 3. This can be achieved by suitable contouring of the pressing tool in connection with the already-mentioned optimised measurement of the volume of the insulating material to be used. Naturally, however, the first plate 1 can also be deformed correspondingly, if it is disposed in a correspondingly contoured die.

Figure 3:
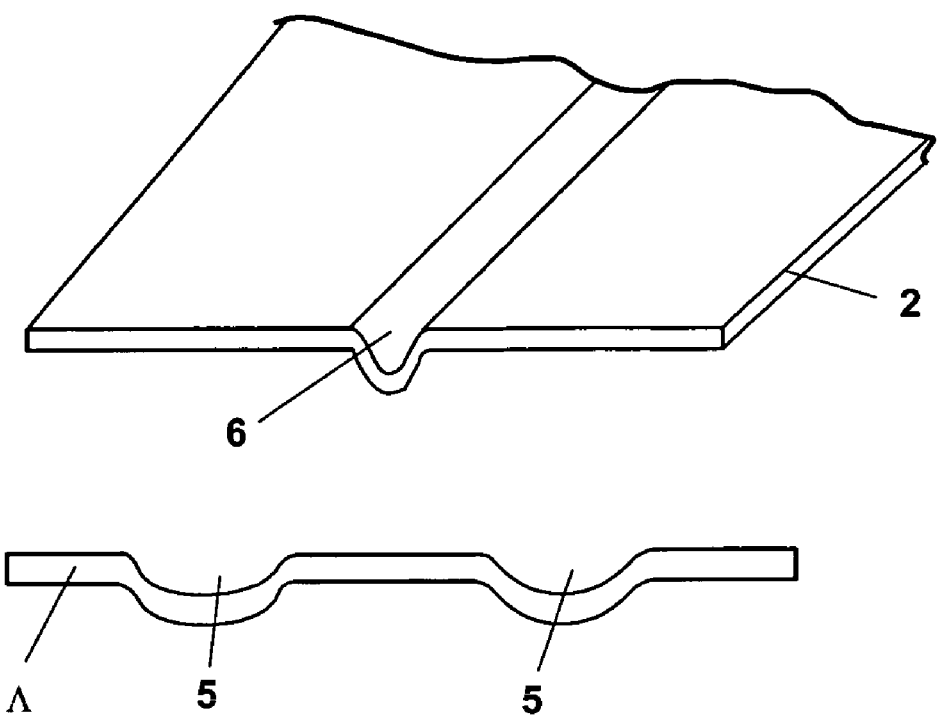
FIG. 3 is a top perspective view of a first plate and a side elevation view of a second plate that may be connected to form a heat shield.

FIG. 3 illustrates two possible embodiments for the first plate 1 and the second plate 2.

In FIG. 3, the first plate 1 is provided with bulges 5, which are disposed locally in such a way that specific regions, in which the thermal load has to be particularly reduced, can be taken into account. In the manufacture according to the present invention of such a heat shield, a larger amount of insulating material 3 is then distributed into the bulges 5, and consequently the insulating effect of the heat shield is increased.

The second plate 2, which is represented in FIG. 3, is provided with a bead 6 which, during the manufacture of the heat shield according to the present invention, can likewise deliberately influence the distribution of the trickled-on insulating material 3, since insulating material 3 is displaced in the region of the bead 6. Instead of the bead 6, however, a web can also be used.

The configurations of the bulges 5 or those of one or more beads 6 have, moreover, the advantage that the stability of the heat shield can be additionally increased.

The first and second plates 1 and 2, shown in FIG. 3, can be used both individually and together to manufacture a heat shield according to the present invention, the embodiments then not having to be limited to the configuration and arrangement shown, but, for example, a crosswise arrangement of a plurality of beads or webs can be used.

Figure 4:
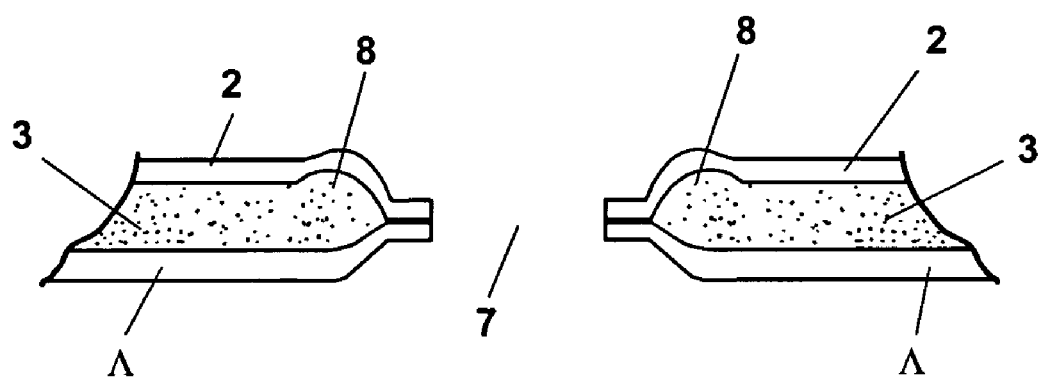
FIG. 4 is a partial sectional view of another embodiment of a heat shield formed in accordance with another aspect of the present invention.

FIG. 4 shows a further embodiment of a heat shield configured according to an aspect of the present invention, in partial sectional view, in which in particular the part is shown in which a screw hole 7 is formed.

During the manufacture of this heat shield, the process is such that the region of the screw hole 7 is left free when the insulating material 3 is applied, or this region, as referred to in more detail in the specification already, is freed after the application of insulating material 3. Thereafter, there is compaction of the insulating material with a pressing tool in at least one working cycle, and after this first compaction, insulating material is, in this example, applied again in a circular manner around the screw hole 7, and thereafter the second plate 2 is pressed with a correspondingly contoured pressing and stamping tool against the insulating material 3, towards the first plate 1. Here, particularly the insulating material 3 subsequently applied in region 8 is compacted, and the two plates 1 and 2 are correspondingly deformed, the first plate 1 being advantageously disposed on a correspondingly configured die for this purpose. The pressing tool to be used stamps in the same working cycle the actual screw hole 7 in the heat shield and it is thus possible to produce, with relatively low manufacturing outlay, a very advantageous embodiment of a heat shield according to the invention, in which a through-hole 7 has to be present for fastening or for other purposes. The material accumulation in region 8 here causes substantially better heat and sound insulation in this particularly critical region.

What is claimed is:

1. A method of manufacturing a beat shield suitable for use in motor vehicles comprising the steps of:
    providing first and second plates, each said plate having an edge region and being at least partially plastically deformable;
    providing an insulating material onto said first plate to cover at least a portion of said first plate;
    compacting at least a portion of said insulating material; and
    connecting said edge region of said first plate to said edge region of said second plate such that said insulating material is positioned between said first and second plate, wherein said insulating material is selected from the group consisting of mica, expanded graphite, perlite, and a mica decomposition.

2. A method as recited in claim 1, wherein the form of said insulating material is selected from the group consisting of powder and flakes.

3. A method as recited in claim 1, wherein said first and second plates are connected at said edge regions by a connection selected from at least one of the group consisting of a positive connection and a non-positive connection.

4. A method as recited in claim 1, wherein said insulating material includes a filler.

5. A method as recited in claim 1, wherein said compacting of said insulating material is achieved by movement of said second plate towards said first plate.

6. A method as recited in claim 1, wherein said compacting of said insulating material is carried out by a pressing tool in at least one pressing movement.

7. A method as in recited in claim 1, including the steps of applying additional insulating material onto at least regions of said first plate and the previously compacted insulating material and compacting said additional insulating material.

8. A method as recited in claim 1, further comprising removing said insulating material that is not compacted.

9. A method as recited in claim 1, wherein said insulating material is applied substantially evenly on said first plate.

10. A method as recited in claim 1, wherein said insulating material is provided on said first plate in the shape of a cone; and wherein said compacting of said insulating material distributes said insulating material on said first plate.

11. A method as recited in claim 1, wherein said first plate is partially deformed prior to providing said insulating material.

12. A method as recited in claim 11, wherein said first plate is at least partially deformed in the shape of a trough.

13. A method as recited in claim 1, wherein an inorganic binding material is applied to said first plate prior to providing said insulating material.

14. A method as recited in claim 1, wherein at least one of said plates includes a surface formation to facilitate the distribution of said insulating material upon compaction.

15. A method as recited in claim 1, wherein said second plate is at least partially flanged to said edge of said first plate.

16. A method as recited in claim 1, wherein the compacting of said insulating material is controlled so that the space between said first and second plates that is not used to physically connect said plates is completely covered with insulating material.

17. A method as recited in claim 1, wherein the heat shield is three-dimensionally deformed after said first and second plates are connected.

18. A method as recited in claim 1, wherein at least a portion of said first plate is electrostatically charged prior to the application of said insulating material and said insulating material applied to the non-charged portion of said first plate is removed prior to compaction.

19. A method as recited in claim 1, including the step of removing a portion of said insulating material from said first plate with a tool that is electrostatically charged in certain regions.

20. A heat shield suitable for use in motor vehicles comprising:
    a first plate that is at least partially plastically deformable;
    a second plate that is at least partially plastically deformable; and
    an insulating material that is compacted;
    wherein said first plate is connected to said second plate and said insulating material is positioned between said first plate and said second plate and is selected from the group consisting of mica, expanded graphite, perlite, and a mica decomposition, and wherein at least one of said first and second plates has a surface with increased roughness as compared to a corresponding surface of said other plate.

21. A heat shield as recited in claim 20, wherein said insulating material is in a form selected from the group consisting or powder and flakes.

22. A heat shield as recited in claim 20, wherein at least one of said first and second plates is comprised of metal.

23. A heat shield as recited in claim 20, wherein at least one of said first and second plates includes a surface deformation.

24. A heat shield as recited in claim 23, wherein said surface deformation includes a deformation selected from the group consisting of bulges, beads, or webs.

25. A heat shield as recited in claim 20, wherein at least one of said first and second plates includes a surface that is coated with a material that reflects radiated heat.

26. A heat shield as in recited in claim 20, wherein the thickness of said insulating material positioned between said first and second plate is varied at different locations between said first and second plate.

27. A heat shield as recited in claim 20, wherein predetermined portions of the heat shield are kept free of said insulating material.

28. A method for manufacturing a heat shield to be used in motor vehicles, comprising:
   providing at least first and second external plates;
   applying an insulating material to one of said first and second external plates so as to at least partially cover said one external plate, said applied insulating material being one of a granular, powder and flake form and free of binding agent;
   compacting said insulating material into a predetermined contour;
   positioning said other of said first and second external plates adjacent to said insulating material such that said insulating material is positioned between said first and second external plates; and
   connecting said first and second external plates together to capture said insulating material therebetween.

29. A method as recited in claim 28, wherein said compacting step takes place before said connecting step.

30. A method as recited in claim 28, wherein said insulating material is selected from the group consisting of mica, expanded, graphite, perlite, and a mica decomposition.

31. A heat shield suitable for use in motor vehicles comprising:
   a first plate that is at least partially plastically deformable;
   a second plate that is at least partially plastically deformable; and
   an insulating material that is compacted;
   wherein said first plate is connected to said second plate and said insulating material is positioned between said first plate and said second plate and is selected from the group consisting of mica, expanded graphite, perlite, and a mica decomposition, and wherein at least one of said first and second plates includes a surface that is coated with a material that reflects radiated heat, and wherein the plate positioned on the side of the heat shield that is remote from the radiated heat includes a modification selected from the group of modifications consisting of (a) increased thickness, (b) the inclusion of one or more ribs, and (c) the inclusion of a material having good heat-conducting capacity.

\* \* \* \* \*